(12) United States Patent
Bagarolo et al.

(10) Patent No.: US 10,904,319 B2
(45) Date of Patent: *Jan. 26, 2021

(54) DYNAMIC DEPLOYMENT OF AN APPLICATION BASED ON MICRO-SERVICES

(71) Applicant: International Business Machines Corporation, Armonk, NY (US)

(72) Inventors: Antonio Bagarolo, Marcianise (IT); Antonio Di Cocco, Rome (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,184

(22) Filed: Feb. 4, 2019

(65) Prior Publication Data

US 2019/0173940 A1 Jun. 6, 2019

Related U.S. Application Data

(63) Continuation of application No. 15/607,728, filed on May 30, 2017, now Pat. No. 10,255,052.

(51) Int. Cl.
*H04L 29/08* (2006.01)
*G06F 11/30* (2006.01)
(Continued)

(52) U.S. Cl.
CPC ............... *H04L 67/10* (2013.01); *G06F 8/60* (2013.01); *G06F 11/302* (2013.01);
(Continued)

(58) Field of Classification Search
CPC . G06F 8/60; G06F 8/61; G06F 11/302; H04L 67/10; H04L 41/0806;
(Continued)

(56) References Cited

U.S. PATENT DOCUMENTS 8,918,448 B2 12/2014 DeLuca et al.
9,170,797 B2 10/2015 Raman
(Continued)

FOREIGN PATENT DOCUMENTS

CA 2704461 11/2010

OTHER PUBLICATIONS

Panda et al., "Verification in the Age of Microservices" (Year: 2017).*

(Continued)

*Primary Examiner* — Phillip H Nguyen
(74) *Attorney, Agent, or Firm* — Schmeiser, Olsen & Watts, LLP; William Hartwell

(57) ABSTRACT

A method for determining a deployment configuration of multiple micro services that interact with each other is provided. The method includes the steps of determining a metric describing an amount of communication traffic between at least two of the micro services. Based on the metric, an execution environment may be determined for at least one of the micro services. Deployment information specifying that the at least one micro service shall be deployed on the determined execution environment may be generated.

20 Claims, 10 Drawing Sheets

(51) Int. Cl.
  *H04L 12/24*   (2006.01)
  *H04L 12/26*   (2006.01)
  *G06F 8/60*    (2018.01)

(52) U.S. Cl.
  CPC ...... *H04L 41/0806* (2013.01); *H04L 41/0893* (2013.01); *H04L 43/08* (2013.01); *H04L 43/087* (2013.01); *H04L 43/0829* (2013.01); *H04L 67/02* (2013.01); *H04L 67/1036* (2013.01); *H04L 67/34* (2013.01); *H04L 43/16* (2013.01)

(58) Field of Classification Search
  CPC . H04L 41/0893; H04L 43/08; H04L 43/0829; H04L 43/087; H04L 67/02; H04L 67/1036; H04L 67/34; H04L 43/16
  See application file for complete search history.

(56) References Cited

U.S. PATENT DOCUMENTS

| | | | |
|---|---|---|---|
| 10,348,838 B2* | 7/2019 | Yang | G06F 9/5027 |
| 2010/0235494 A1 | 9/2010 | Sood et al. | |
| 2012/0005051 A1 | 1/2012 | Deng et al. | |
| 2012/0266168 A1 | 10/2012 | Spivak et al. | |
| 2016/0112475 A1* | 4/2016 | Lawson | H04L 67/02 709/204 |
| 2017/0187785 A1* | 6/2017 | Johnson | H04L 67/10 |
| 2018/0026856 A1 | 1/2018 | Yang et al. | |
| 2018/0088935 A1 | 3/2018 | Church et al. | |
| 2018/0159747 A1* | 6/2018 | Chang | H04L 41/5045 |
| 2018/0349121 A1 | 12/2018 | Bagarolo et al. | |

OTHER PUBLICATIONS

Johannes Thones, "Microservices" (Year: 2015).*
Escobar et al., "Towards the Understanding and Evolution of Monolithic Applications as Microservices" (Year: 2016).*
Amazon EC2 Container Service—Docker Management—AWS, Retrieved from Internet on Sep. 30, 2016, https://aws.amazon.com/ecs/, 7 pages.
Sousa et al., HAL, Automated Setup of Multi-Cloud Environments for Microservices-Based Applications, HAL Id: hal-01312606, https://hal.inria.fr/hal-01312606, Submitted on May 7, 2016, 9 pages.
Marathon: A container orchestration platform for Mesos and DCOS, Retrieved from Internet on Sep. 30, 2016, https://mesosphere.github.io/marathon/, 6 pages.
Pattern: Microservices Architecture pattern, Retrieved from Internet on Sep. 30, 2016, http://microservices.io/patterns/microservices.html, 9 pages.
Kubernetes—Production-Grade Container Orchestration, Retrieved from Internet on Sep. 30, 2016, http://kubernetes.io/, 7 pages.
Office Action (dated May 17, 2018) for U.S. Appl. No. 15/607,728, filed May 30, 2017.
Kang et al., "Container and Microservice Driven Design for Cloud Infrastructure DevOps", 2016.
Guo et al., "Microservices Architecture based Cloudware Deployment Platform for Service Computing", 2016.
Amendment (dated Aug. 17, 2018) for U.S. Appl. No. 15/607,728, filed May 30, 2017.
Notice of Allowance (dated Nov. 23, 2018) for U.S. Appl. No. 15/607,728, filed May 30, 2017.

* cited by examiner

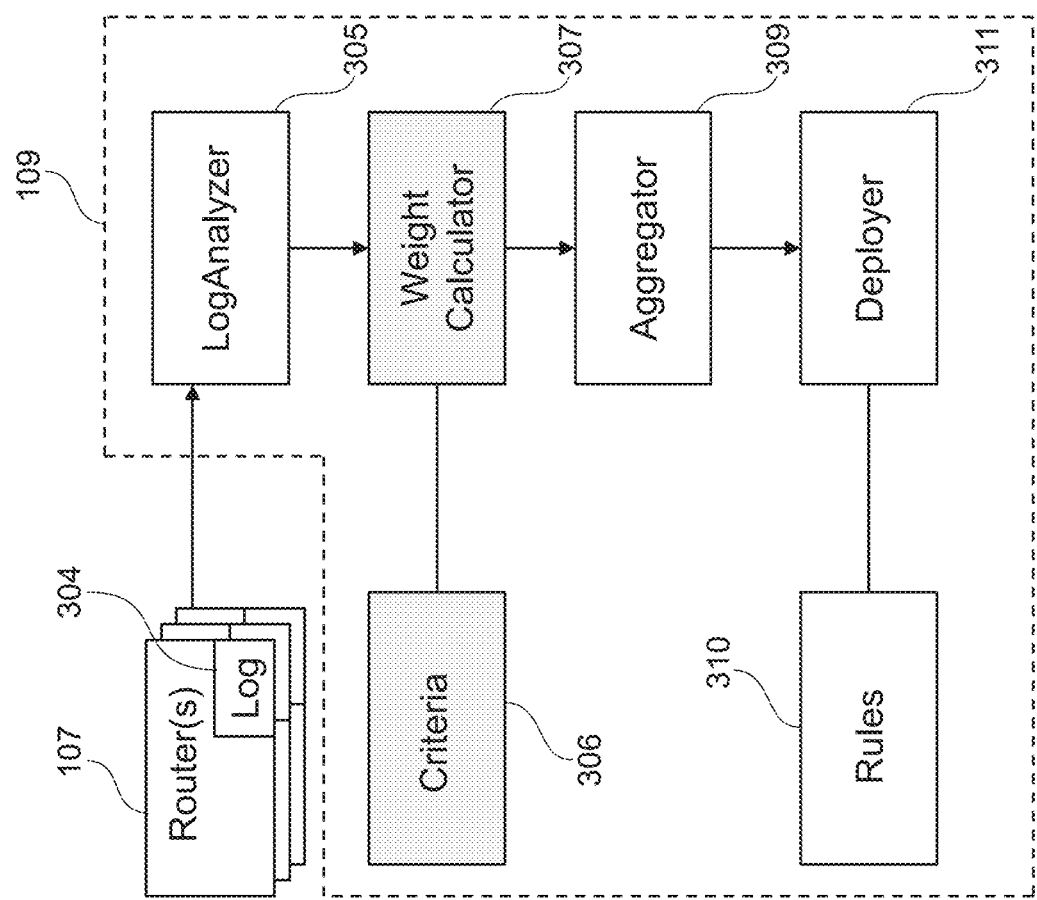
Fig. 3B
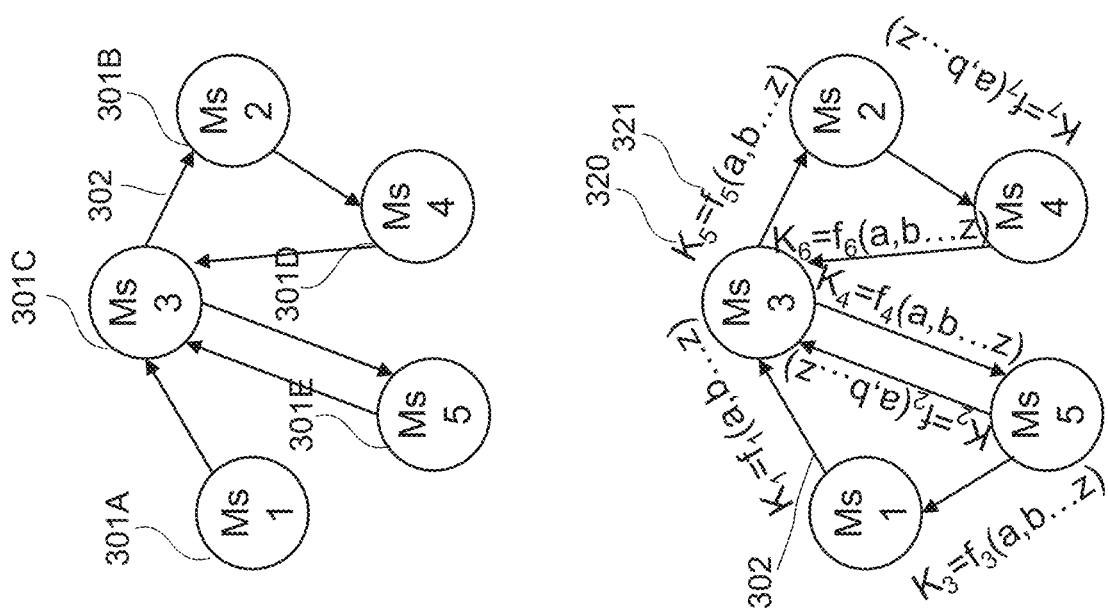

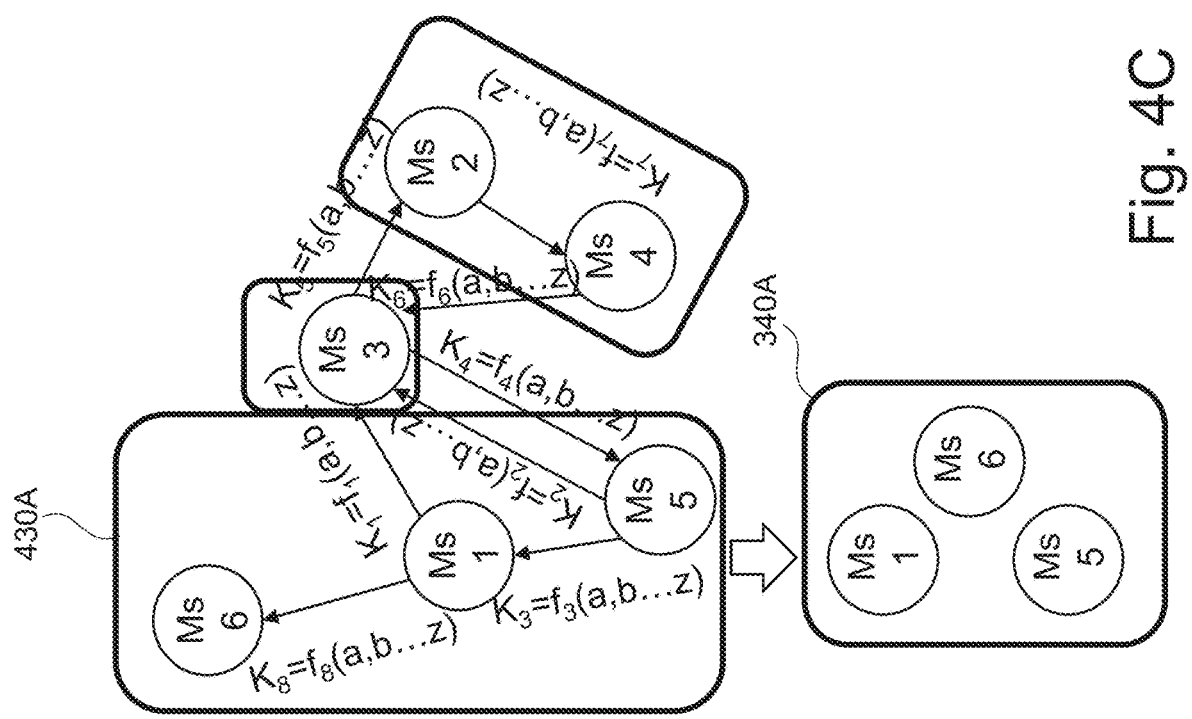

DYNAMIC DEPLOYMENT OF AN APPLICATION BASED ON MICRO-SERVICES

This application is a continuation application claiming priority to Ser. No. 15/607,728, filed May 30, 2017, now U.S. Pat. No. 10,255,052, issued Apr. 9, 2019.

TECHNICAL FIELD

The present invention relates to digital computer systems, and more specifically, to embodiments of a method for determining a deployment configuration of multiple micro services that interact with each other.

BACKGROUND

The software architecture for micro services based applications requires splitting a monolithic application into small pieces where each single component provides part of the overall application capabilities. In order to provide desired micro services, each part could use other micro services as well as external services. For example, in a cloud architecture, each micro service may be deployed on any node within the cloud. The micro services have several advantages, such as allowing developers to update single small parts without affecting the entire application. However, deploying the multiple micro services in more wide topologies is complex and more difficult than deploying a single monolithic application.

SUMMARY

An aspect of this invention relates to a method, and associated computer system and computer program product for determining a deployment configuration of multiple micro services that interact with each other. A processor of a computing system determines a metric describing an amount of communication traffic between at least two of the plurality of micro services. Based on the metric, an execution environment for at least one of the plurality of micro services is determined. Deployment information is generated that specifies that the at least one micro service of the plurality of micro services shall be deployed on the determined execution environment.

BRIEF DESCRIPTION OF THE DRAWINGS

FIG. 3B depicts a diagram of a second phase of a method for determining a deployment configuration of multiple micro services, in accordance with embodiments of the present invention.

FIG. 4C depicts a diagram of a third phase of a method for determining a deployment configuration of a new micro service, in accordance with embodiments of the present invention.

DETAILED DESCRIPTION

Figure 1:
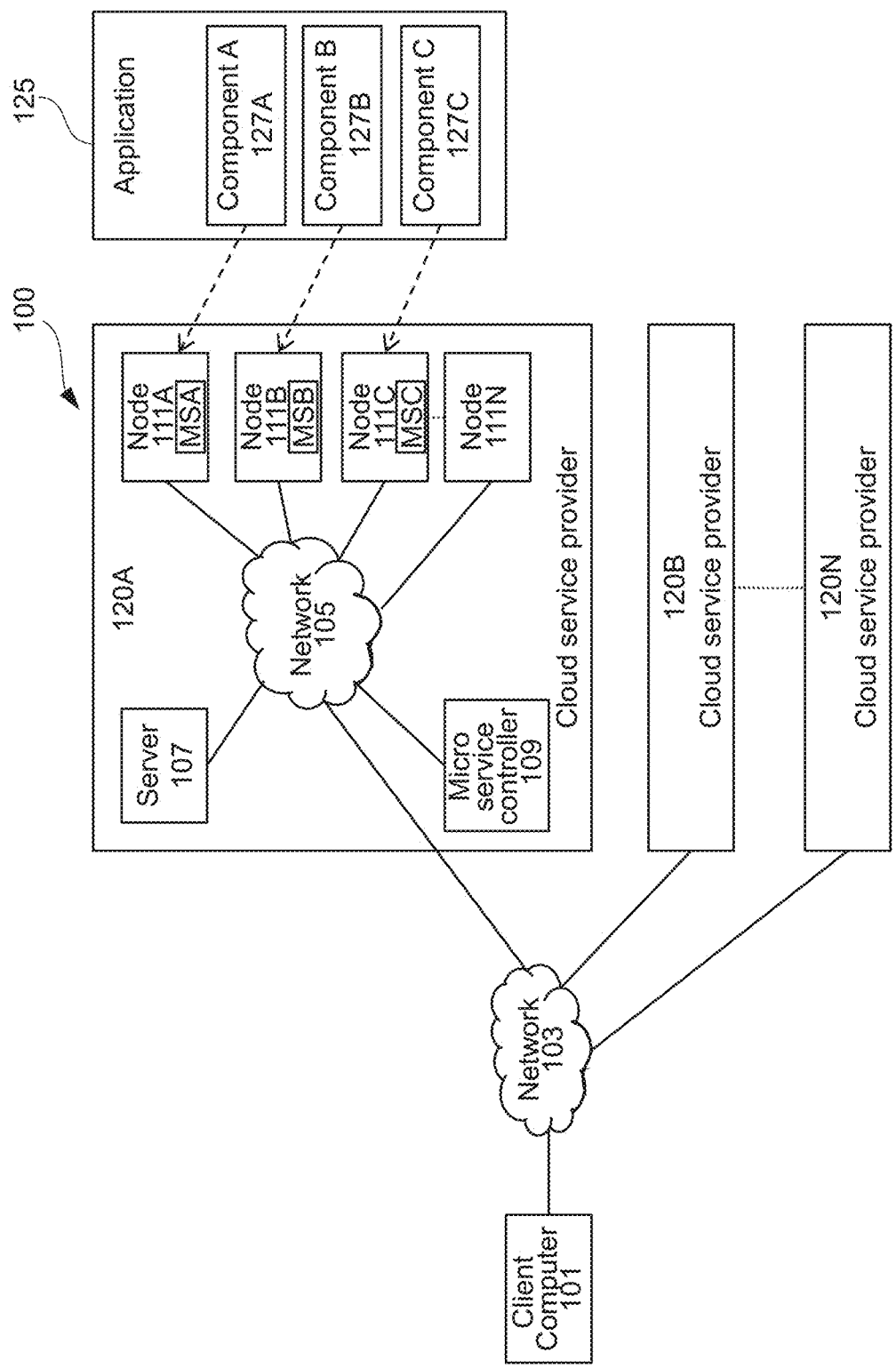
FIG. 1 is block diagram of a system which may enable a cloud computing environment, in accordance with embodiments of the present invention.

A software application may be broken down into individual micro services that are individually maintained, addressed, and deployed in a network. Micro services may be processes that communicate with each other over the network in order to fulfill a goal or task of the application. Each micro service is located on an individually addressable node in the network. Each micro service typically (although not necessarily) executes a particular function. Each micro service may be made available for use (and reuse) by other micro services or other software programs through a defined interface. For example, two or more different micro services may cooperate or function interactively to provide a single service. For example, cooperating micro services may involve a first micro service generating a reply based on the reply of a second micro service. An example of the software application may comprise a web application doing different activities and each of the different activities are implemented by a different sub application (e.g a web application for online shopping, in which the web application may have one sub application listing a catalog, one sub application for the credit card transaction, and one more for the shopping cart). The sub applications communicate to each other fulfilling an end-to-end feature allowing an end user to navigate through the catalog, select desired items and buy the items. Each of the sub applications may be implemented as a micro service.

Large applications are generally based on different sub-components, each of them depending on the other, which means that any time a change to any of the large application's sub-components, a redeploy of the entire configuration may be needed. Using micro services, a single application may be split into smaller components and each of the smaller components may be deployed on a node within a distributed computing system, such as a cloud. A micro service performs a piece of overall work by requiring other micro services to perform the other jobs. When the application is deployed, each single micro service could run on different node, or even the same node, which could lead to an inefficient situation where the most intensive job exchange components run on the farthest nodes or two micro services not exchanging data at all run on same node.

Embodiments of the present invention manages complex deployment for a micro services based application making the deployment easy and automatically managed with a method that produces and implements an optimal deploy strategy, which considers different constraints, such as network bandwidth. For example, by analyzing a router traffic without requiring or modifying the application itself, embodiments of the method may optimize deployment of micro services.

In an exemplary embodiment, the present method may prevent an unmanaged situation that is caused by the fact that the application is deployed within a cloud infrastructure where an end-user has no control on infrastructure and just a limited control on deployment, and by the fact that the inter micro service communication involves a high exchange of requests using API (e.g. such as HTTP and REST API) invocation.

Embodiments of the present method may have the advantage of efficiently using and deploying the micro services, which may increase a throughput of the system using a constant number of resources without a need to increase the resources. The deployment may have the advantage that network performances are properly balanced to find an appropriate solution for a network provider. Furthermore, a number of micro services scale, and the difficulty in finding a properly balanced solution becomes increasingly complex. Embodiments of the present method may provide a solution for the number of micro services that scale.

Embodiments of the present method may be executed dynamically, while the micro services are interacting or cooperating to perform a given function or task, which may have the advantage of preventing a network congestion that may be caused by one or more micro services.

In another embodiment, the micro services may perform the functionality of an application. The application may have been run at least once and log files may have been produced by each of the micro services. Embodiments of the present method may be executed before rerunning the application again, and the log files may be used to determine or evaluate the metric. The metric provides a means for determining the capabilities of the network through which the micro services communicate. For example, the metric may comprise load characteristics, such as network bandwidth capabilities, network congestion, delay, delay jitter, loss rate, etc., which may consider any communication aspect including number of network devices involved (e.g. firewalls, switches, etc.) in order to improve overall application throughput.

According to an exemplary embodiment, determining the metric comprises executing at least one micro service, analyzing log data generated by the micro service and calculating the metric based on the analyzing. For example, the metric may be determined while executing the at least one micro service or after executing the at least one micro service, which may provide an accurate deployment based on the resource usage of the micro service to be deployed.

According to an exemplary embodiment, determining the execution environment is further based on an amount of available communication resources for data exchange between candidate execution environments on which the micro services could be deployed, which may further increase the usage efficiency of the execution environments. Increasing the usage efficiency of the execution environments may allow running additional micro services as the resources may be optimally used by embodiments of the present deployment method.

According to an exemplary embodiment, the execution environment comprises at least one of: a computing node, a virtual machine instantiated on a computing node, a software container instantiated on a computing node, a cluster of multiple computing nodes, or a data center. For example, the execution environment may be part of a cloud environment. Having multiple types of environments may provide flexibility in deploying the micro services and thus may further increase the deployment efficiency of embodiments of the present method.

According to an exemplary embodiment, the method comprises deploying new micro services on the execution environment specified by the deployment information. The new micro services may be updates or additional modifications in the application whose multiple micro services are deployed with the present method. Adding new micro services into the same execution environment may save time that old otherwise be required for re-determining the execution environment. The execution environment may be determined such that the execution environment can contain more than the at least one micro service.

According to an exemplary embodiment, the method comprises modifying the deployment of an already instantiated micro service based on the deployment information, the modifying including migrating the micro service from an original execution environment, on which the micro service is currently running, to a target execution environment specified by the deployment information, which may enable an in-time fix of network problems that may be caused by chatty micro services.

FIG. 1 is block diagram of a system 100 which may enable a cloud computing environment, in accordance with embodiments of the present invention. The system 100 comprises a client computer 101 with cloud service providers 120A-N. For example, FIG. 1 shows that client computer 101 is in communication with cloud service provider 120A over network 103, which is in communication within a network 105 internal to the cloud service provider 120A. For example, the client computer 101 may be configured to execute one or more applications.

The network 103 comprises the Internet, local area networks (LAN), wide area networks (WAN) or a combination thereof. The network 103 is in communication with the internal network 105. The network 105 comprises a LAN, the Internet, WAN or a combination thereof. The networks 103 and 105 may or may not be different. In another example, the client computer 101 may be directly coupled to the network 105 without the use of another network 103. The client computer 101 may be part of the cloud service provider 120A.

As used herein, a "cloud service provider" refers to an entity provides computing resources. As such, when a software application or service is running on the system 100, the application or service owner may not know on which computer system the service/application is actually running. Cloud service providers 120A-N may be heterogeneous and may offer disparate functionality.

The cloud service provider 120A includes at least one server (or router) 107, network 105, micro service controller 109, and a plurality of nodes 111. The server 107 serves as an interface between the client computer 101 and the cloud service provider 120A. For example, the server 107 is configured to receive communication requests from the client computer 101 to access one or more services or resources provided by cloud service provider 120A. The at least one server 107 may provide a router functionality for connecting the nodes 111 inter or intra cloud service providers 120A-N. The server 107 may create log files comprising data indicative of the communication between the micro services.

A node of the nodes 111 comprises a discrete computing unit that includes processing capabilities, memory in which to execute one or more applications, and non-volatile storage for persistent storage of data or applications. For example, a node 111 may comprise one or more microprocessors, a plurality of virtual machines, where each of the plurality of virtual machines is provided with access to one or more microprocessors, a quantity of RAM, and storage space on one or more hard drives of the node 111. In another example, node 111 may be provided by a plurality of physical computers that have been linked together, such as in a cluster.

Nodes 111 within the cloud service provider 120A may or may not be identically configured. For example, the cloud service provider 120A may provide a variety of different nodes that may have different configurations. For example, the cloud service provider 120A may provide different types of nodes with increasing amounts of processing resources. The nodes 111 may comprise a pool of idle or unallocated nodes as well as allocated nodes.

The system 100 may be configured to deploy and run a micro services-based application 125. The application 125 may be a computer program designed to perform a group of coordinated functions, tasks, or activities for the benefit of the user of the application 125. For example, the application 125 may be divided into different sections or tiers that may interact or communicate with each other via network 105 and/or network 103 in order to perform at least part of the functions or tasks or activities of the application 125. For exemplification purpose, application 125 is shown as including three components: component A 127A, component B 127B and component C 127C. As will be understood, each software application may include a different number of components.

The software components 127A-C may be deployed on the system 100 as micro services being processes that communicate with each other over network 105 and/or 103, which may enable software components 127A-C to communicate and cooperate over the network 105 and/or 103, without requiring any human interaction or changes in the underlying program.

A micro service may be a discrete unit of functionality that can be accessed remotely and acted upon and updated independently. A micro service may be self-contained.

In the embodiment depicted by FIG. 1, the application 125 is deployed such that micro service MSA that performs the functionality of the component 127A, is running on node 111A, micro service MSB that performs the functionality of the component 127B, is running on node 111B, micro service MSC that performs the functionality of the component 127C, is running on node 111C. There are many different possibilities for running micro services MSA-C on different nodes of the same or different cloud service providers 120A-N. Each micro service MSA-C of the application 125 may require different resources (e.g. software platforms, databases etc.), and have different location and redundancy requirements. Selection of cloud service providers for deploying the application 125 may take into account the individual requirements of each micro service, as well as the global requirements of reliability and scalability. The communication between micro services MSA-MSC may for example be done via an API, such as a HTTP and REST API.

The micro service controller 109 may be configured to perform at least part of the present method. Although shown as an independent component, the micro service controller 109 may be part of the server 107.

For simplifying the description, FIG. 1 describes details with regard to cloud service provider 120A only. What is described for cloud service provider 120A may hold true for other cloud service provider 120B-N.

Figure 2:
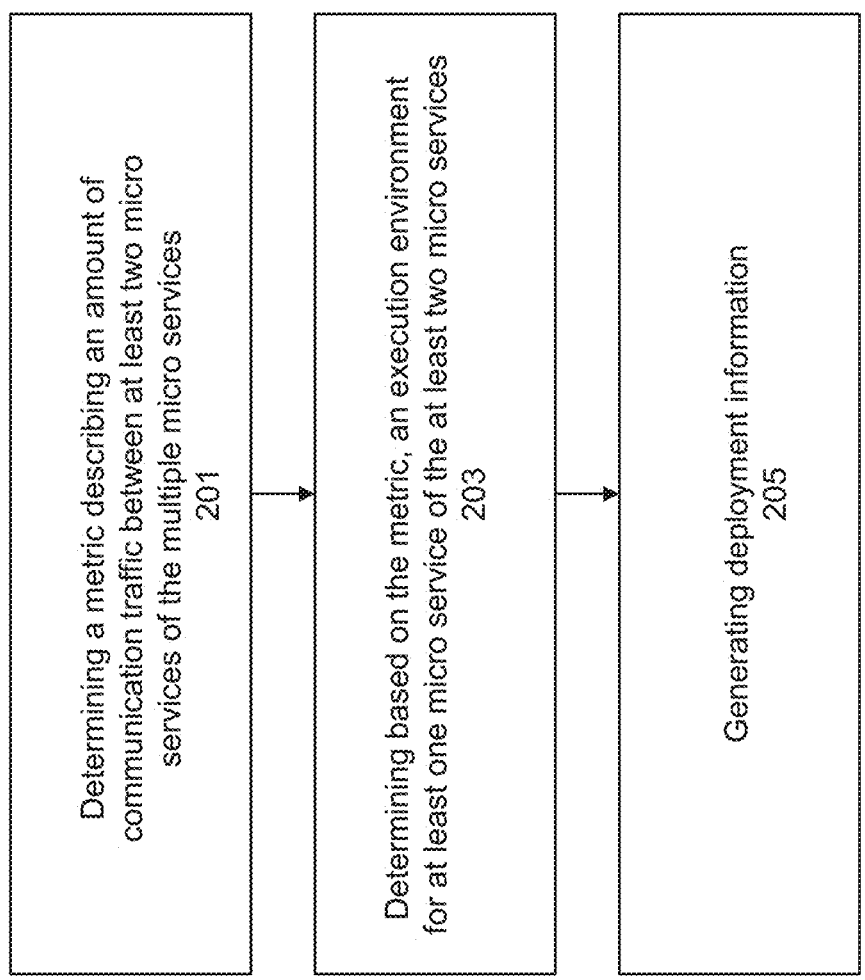
FIG. 2 is a flowchart of a method for determining a deployment configuration of multiple micro services that interact with each other, in accordance with embodiments of the present invention.

FIG. 2 is a flowchart of a method for determining a deployment configuration of multiple micro services that interact with each other, in accordance with embodiments of the present invention. Embodiments of the multiple micro services (e.g. MSA-MSC) interact with each other in a system, such as system 100. The multiple micro services may correspond to an application 125. In another embodiment, the multiple micro services may correspond to more than one application. The traffic between two micro services may be bidirectional and/or unidirectional. The bidirectional traffic between micro services may be symmetric or asymmetric. A micro service may have multiple communication links with respective micro services (e.g. MSA may communicate with MSB and MSC through two communication links). The multiple micro services may be deployed (e.g. before step 201) on respective multiple nodes. For example, micro services MSA-MSC may be deployed on nodes 111A-C respectively.

In step 201, a metric describing an amount of communication traffic between at least two micro services (e.g. MSA and MSB) of the multiple micro services may be determined or evaluated. In another embodiment, the metric may be determined for all services of the multiple micro services. The at least two micro services may belong to one or more cloud service providers 120.

For example, traffic demands from one micro service to the other micro service, including bandwidths associated with each of the traffic demands, may be monitored (e.g. by micro service controller 109 using the server 107). The monitored information may be logged by the server 107 in log files that may be used by the micro services controller 109.

The metric may comprise at least one of the number of invocations, around of exchanged data between the at least two micro-service, network throughput of the network connecting the at least two micro-services, total number of requests, total amount of data transferred, and response time.

The metric may be evaluated for a predefined time period during which the multiple micro services are interacting. The metric may be evaluated for each direction and each communication link between micro services. For example, if MSA has a bidirectional communication with both MSB and MSC, the metric may be evaluated four times for each of the four communication links. For example, the metric may comprise a number of outgoing and incoming requests to a given micro service.

Step 203 determines, based on the metric, an execution environment for at least one micro service (e.g. MSA of the at least two micro services, MSA and MSB). For example, the execution environment may be determined for micro service MSA. The execution environment may comprise at least one of: a computing node, a virtual machine instantiated on a computing node, a software container instantiated on a computing node, a cluster of multiple computing nodes, or a data center. The execution environment is determined so as to improve the performance, such as the network throughput of the entire system (e.g. system 100).

The at least one micro service MSA may be identified among the micro services MSA-MSC as requiring a redeployment based on the metric. The metric may enable identifying "chatty" micro services which require a significant amount of communications (e.g. a chatty micro service may generate a large number of remote requests and corresponding replies). The negative performance impact of the remote requests and corresponding replies increases as path latency increases, making remote access a challenge for chatty micro services. In another embodiment, a micro service may be classified as chatty or bursty service in that the micro service has low average bit rates and large interpacket spacing, which makes chatty applications inefficient with regard to total data delivered per network resource used.

The determination of the execution environment may for example be based on predefined rules. For example, if the metric indicates that the traffic amount between the at least one micro service MSA and MSB and/or MSC is too high (e.g. the metric value is higher than a predefined threshold), a rule may indicate that the at least one micro service MSA may be placed in a node together with the one micro services (MSB and/or MSC) with which MSA communicates. In this way, the micro services may avoid remote communication. For example, if the metric value indicative of the communication between MSA and MSB is higher than the predefined threshold, the micro service MSA may be added into the node where the MSB initially exists (e.g. the execution environment is determined for MSA only). In another embodiment, the micro services MSA and MSB may be both deployed in a new execution environment different from the one where they have been initially (e.g. the execution environment is determined for both MSA and MSB). The new execution environment may comprise a single computing node on which the MSA and MSB may be deployed. In another embodiment, a cluster of nodes (e.g. two nodes) may be identified and the MSA and MSB may be deployed on this cluster (e.g. each micro service on a respective node). The new execution environment is identified as having enough available (i.e. free) resources compared to the nodes where the MSA and MSB are lastly deployed. The rule may further indicate some restriction, such as placing instances in different availability zones, or which a component has to run or which specific geographic area.

Step 203 may comprise grouping of micro services of the at least two micro services based on the evaluated metric, wherein each group is assigned to a respective execution environment, wherein the at least two micro services comprise two micro services MSA and MSB. If the communication is bidirectional between the micro services MSA and MSB, the metric may be evaluated for each of the two communication directions, which may result in two metric values for the pair of the two micro services MSA and MSB. Each or both of the metric values may be used to group or not group the two micro services MSA and MSB. For example, if at least one of the two metric values is higher than the predefined threshold, the MSA and MSB may be grouped together and the resulting group may thus be assigned to a respective execution environment. If none of the two metric values is higher than the predefined thresholds, the existing deployment of the two micro services may be maintained. If at least one of the two metric values is higher than the predefined threshold, and in addition MSA is in communication with MSC and the metric value indicative of the communication between MSA and MSC is higher than the predefined threshold MSA, MSC and MSB may be grouped together.

The execution environment may be determined based on available resources. For example, the at least one micro service MSA to be deployed may be deployed on an available node that is not busy in that the number of running processes on that node is smaller than a predefined maximum number. In another embodiment, the execution environment may be determined based on the amount of communication between nodes. If for example, a node has a high number of requests to another node, both communicating nodes may be excluded and the execution environment may be chosen from other nodes having smaller outgoing or ingoing communications. In another example, available capacity of resources within each node may be determined and the execution environment may be performed based on the determined available capacity (e.g. a ranking of the nodes may be performed based on the available capacity), and the node having the highest available capacity may be ranked first and so on, such that the execution environment may be selected using that ranking (e.g. using the first ranked node if only one node is required).

If the metrics evaluated for each link going out or into a given micro service are all below the predefined threshold, the given micro service may be maintained in where the micro service is initially deployed or may be redeployed in a new node (e.g. the new node may have more available processing resources compared to the one where the given micro service is initially deployed).

In step 205, deployment information may be generated. The deployment information may specify that the at least one micro service MSA shall be deployed on the determined execution environment. The deployment information may be used to deploy the at least one micro service MSA.

FIGS. 3A-D are diagrams depicting phases of a method for determining a deployment configuration of multiple micro services 301A-E that interact with each other in order to perform at least part of functionalities of an application such as application 125.

Figure 3A:
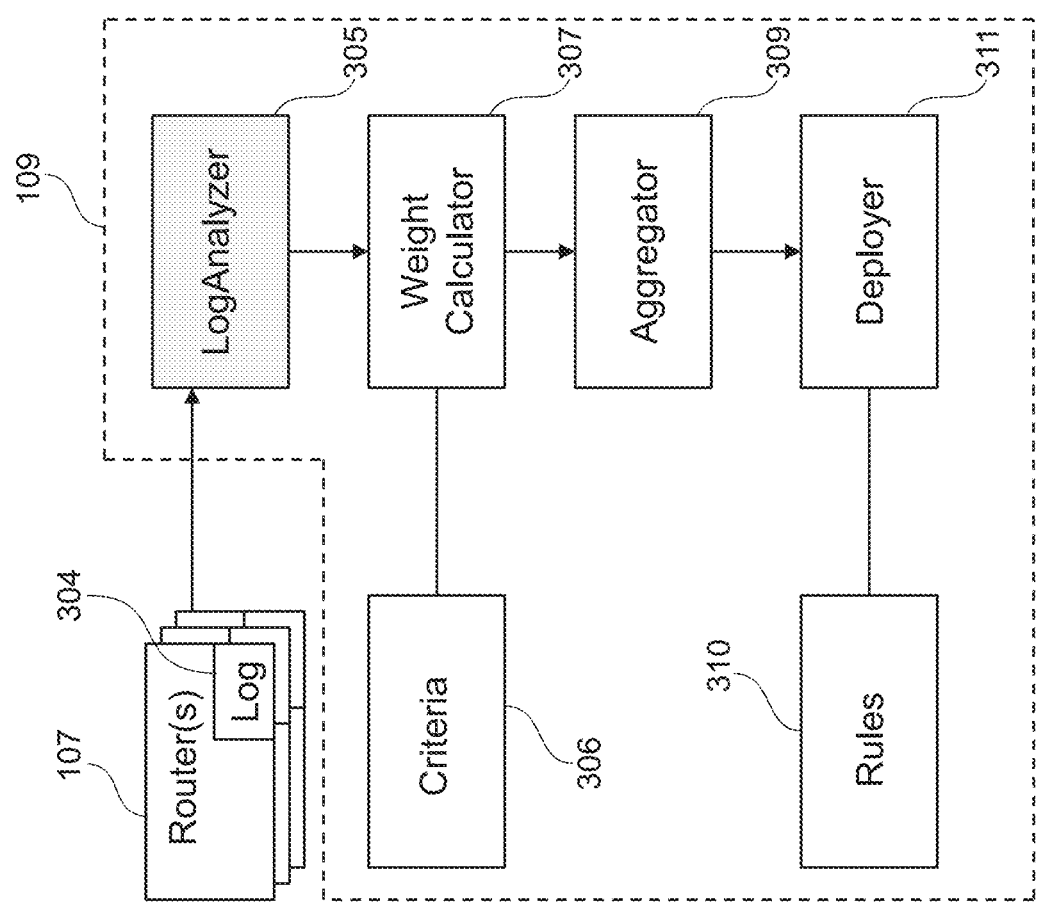
FIG. 3A depicts a first diagram of a first phase of a method for determining a deployment configuration of multiple micro services, in accordance with embodiments of the present invention.
Figure 3A:
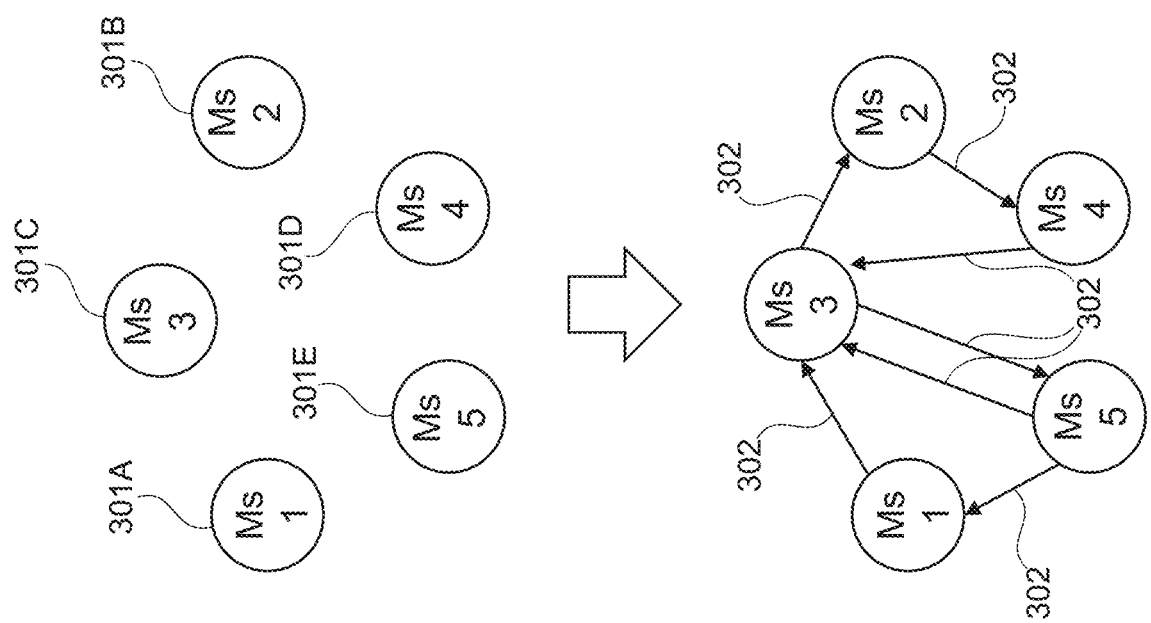

FIG. 3A depicts a first diagram of a first phase of a method for determining a deployment configuration of multiple micro services, in accordance with embodiments of the present invention. As shown in FIG. 3A, the micro services 301A-E may interact or communicate with each other. The communication be unidirectional or bidirectional. For example, each micro service 301A-E may be deployed in a different Virtual Machine within a different infrastructure, for example cloud or container, and can be instantiated on a node e.g. node 111. In the first phase illustrated in FIG. 3A, there is a component, LogAnalyzer 305 of the micro service controller 109, that can track the connections or communications between micro services 301A-E, and monitor the network's hardware and software router(s) log 304 of the server 107 to construct the interconnection between nodes on which the micro services 301A-E are running. The arc orientation 302 denotes dependency between micro services 301A-E, so that if an arc is going from micro service 301A to micro service 301C, the micro service 301A is requesting some job or data from micro service 301C.

FIG. 3B depicts a diagram of a second phase of a method for determining a deployment configuration of multiple micro services, in accordance with embodiments of the present invention. The second phase illustrated in FIG. 3B comprises weighting or assigning weights to arcs 302. The determining of the metric of step 203 comprises, for example, the weighting of the arcs 302. The weight number 320 to be assigned to an arc is the output of a formula or function 321 that is evaluated by weight calculator component 307. The weights are indicated by K1-K7. The function 321 may calculate the metric as described above. The function 321 may be evaluated based on some predefined criteria 306. For example, the function 321 may include and combine normalized characteristics as predefined criteria 306, that is an input for weight calculator component 307. As an example of possible weight, the traffic bandwidth required for communication between two micro services may be evaluated. The weight may dynamically vary with the system evolution. Embodiments of system 100 can adapt by learning on new behavior. Moreover, in one embodiment, criteria 306 used by the function 321 as well as the function 321 itself may be modified (e.g. different metric to be evaluated).

Figure 3C:
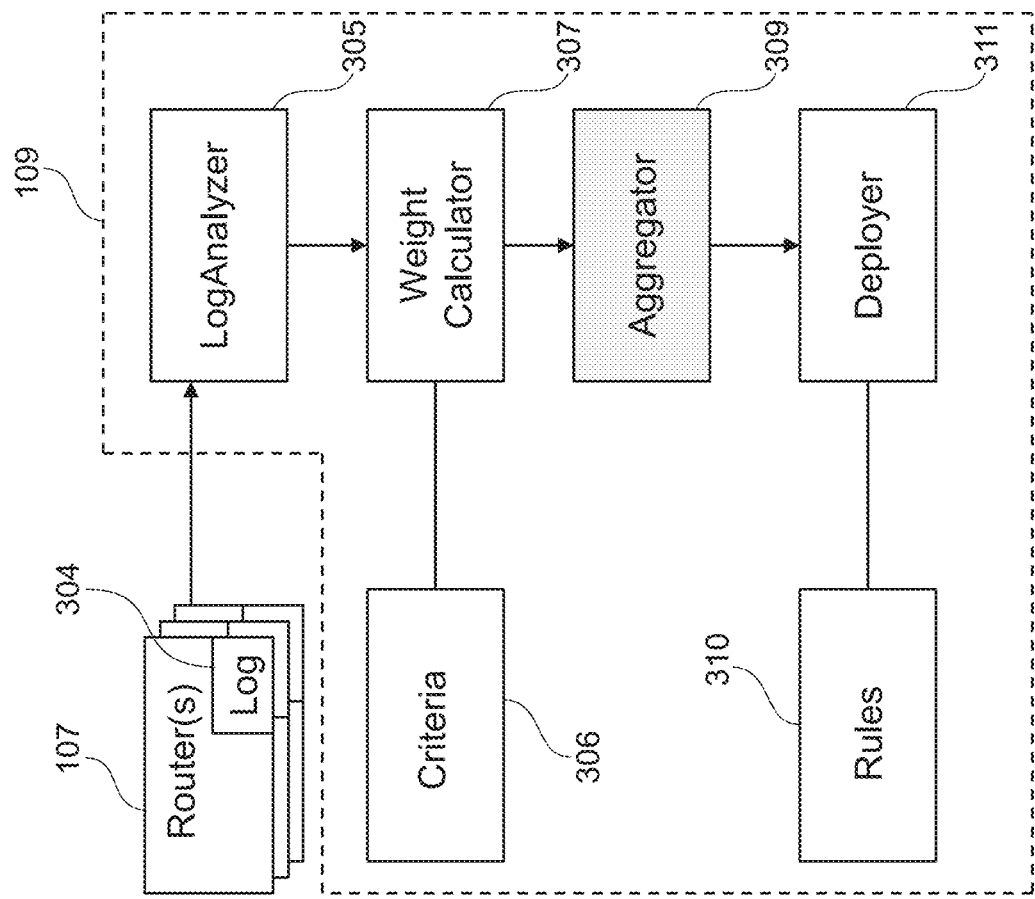
FIG. 3C depicts a diagram of third phase of a method for determining a deployment configuration of multiple micro services, in accordance with embodiments of the present invention.
Figure 3C:
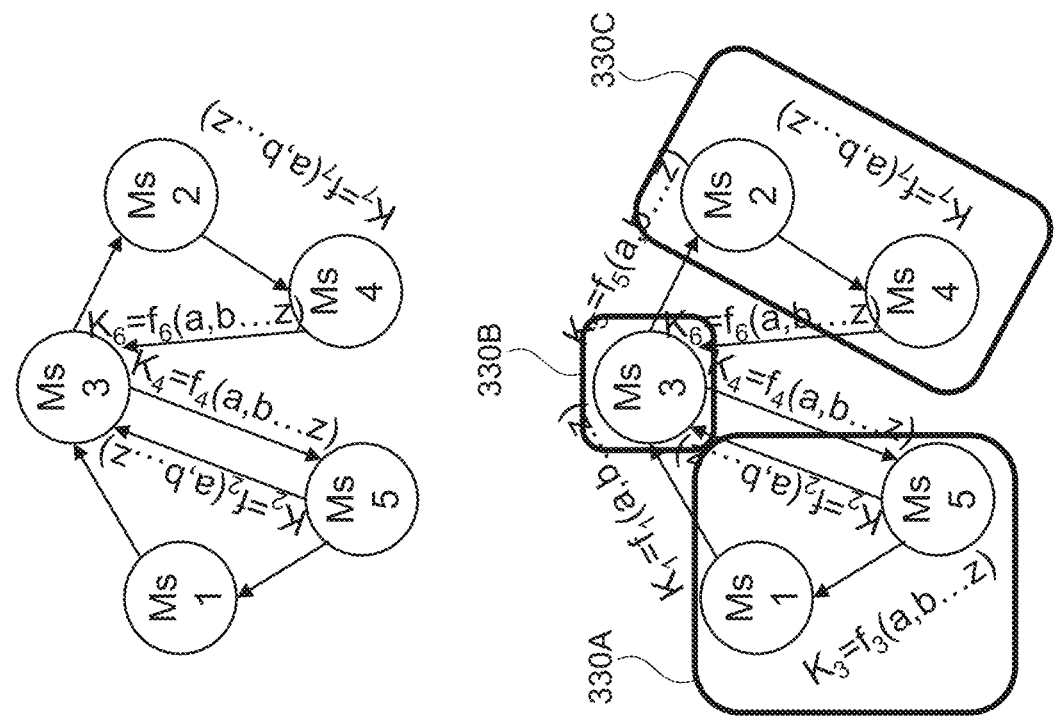

FIG. 3C depicts a diagram of third phase of a method for determining a deployment configuration of multiple micro services, in accordance with embodiments of the present invention. In the third phase illustrated in FIG. 3C, based on gathered information and on the analysis performed on the resulting graph (e.g. that results in the weights 320), the most traffic generator nodes on which micro services 301A-E are running may be grouped together by aggregator component 309 for optimizing network bandwidth usage and increasing performance by limiting traffic between micro-services 301A-E within same group as local traffic rather than network traffic. For example, the weight K3 may indicate that the micro service 301E performs a number of invocations to the micro service 301A that is higher than a predefined threshold. However, the micro service 301A is not performing that many requests or invocations to micro service 301C as indicated by K2, and also as indicated by K2 the micro service 301E is not performing that many requests or invocations to micro service 301C. Thus, only micro services 301E and 301A may be grouped in a single group 330A. In other terms, if K1, K2 and/or K4 are higher than the predefined threshold, the three micro services 301A, 301E and 301C may have been grouped in a single group. The metric used for grouping can be a number as threshold, for example, the K factor, or a more complex function. The grouping by aggregator component 309 results in the inference groups 330A-C.

Figure 3D:
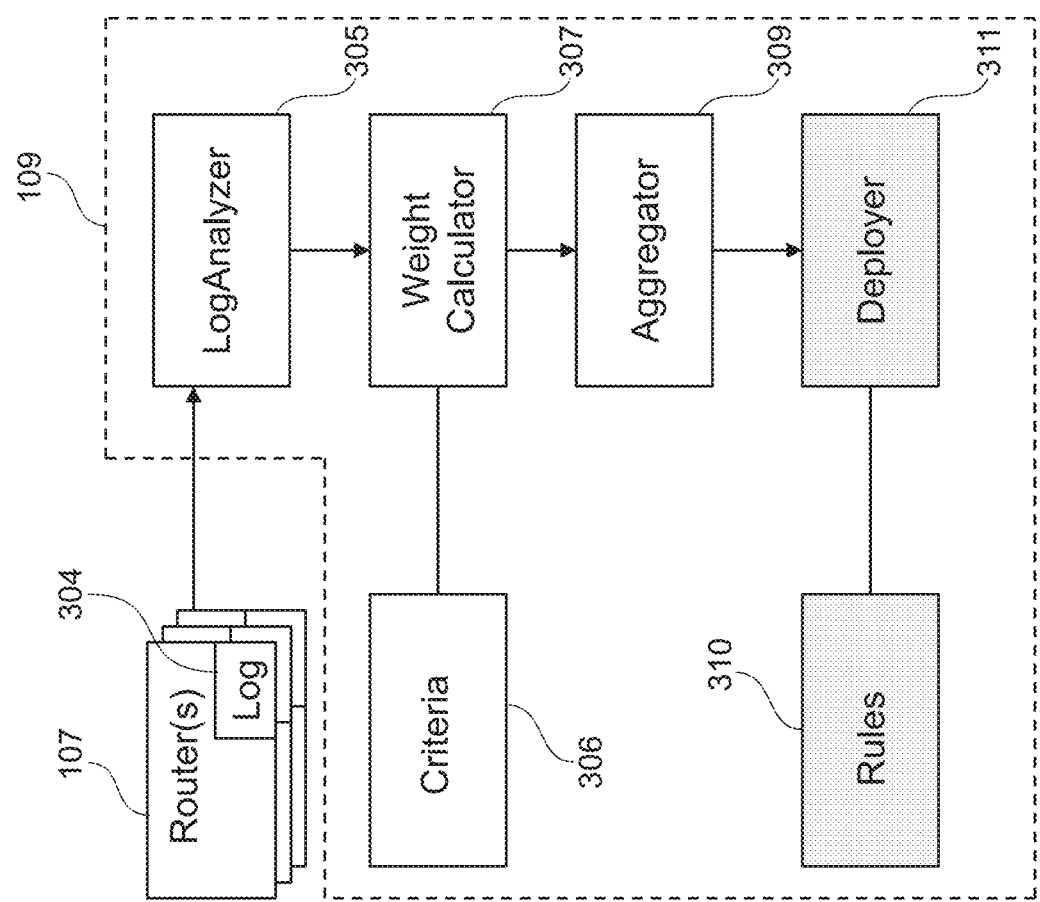
FIG. 3D depicts a diagram of a fourth phase of a method for determining a deployment configuration of multiple micro services, in accordance with embodiments of the present invention.
Figure 3D:
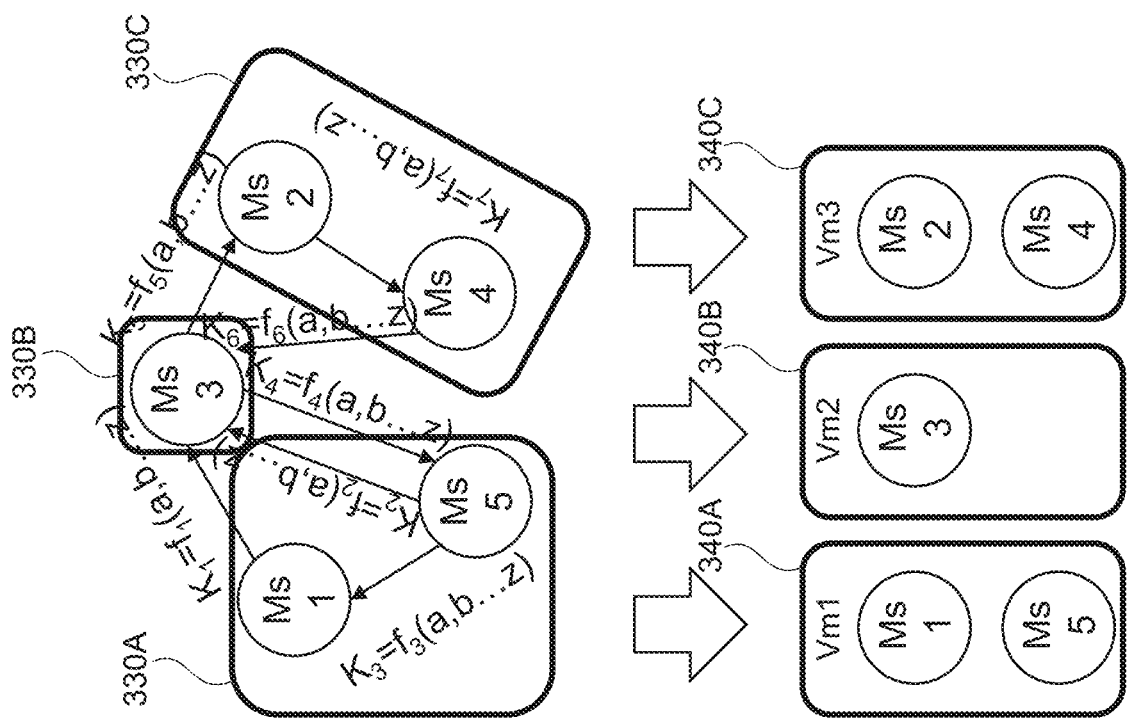

FIG. 3D depicts a diagram of a fourth phase of a method for determining a deployment configuration of multiple micro services, in accordance with embodiments of the present invention. The fourth phase illustrated in FIG. 3D provides a deploy strategy which is the output of Deployer component 311, that can take into count some predefined rules 310 as input. The predefined rules 310 can change the deployment strategy on needs, because sometimes there are other constraints that come into play, for example, a constraint on the total number of VMs or particular infrastructure technology such as Docker container and other, or topology, that cannot be formalized before in the criteria 306. As shown in FIG. 3D, the groups 330A-C are deployed on respective virtual machines VM1-VM3 340A-C.

Figure 4A:
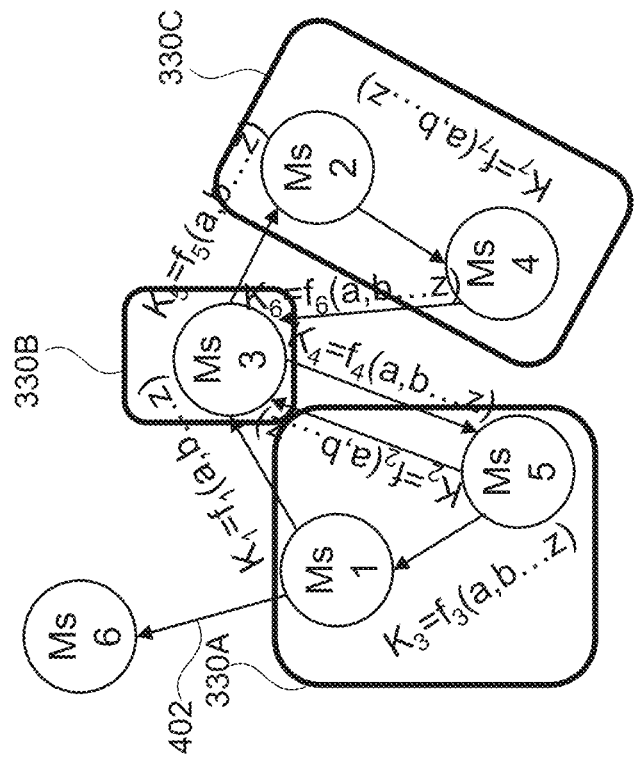
FIG. 4A depicts a diagram of a first phase method for determining a deployment configuration of a new micro service, in accordance with embodiments of the present invention.
Figure 4A:
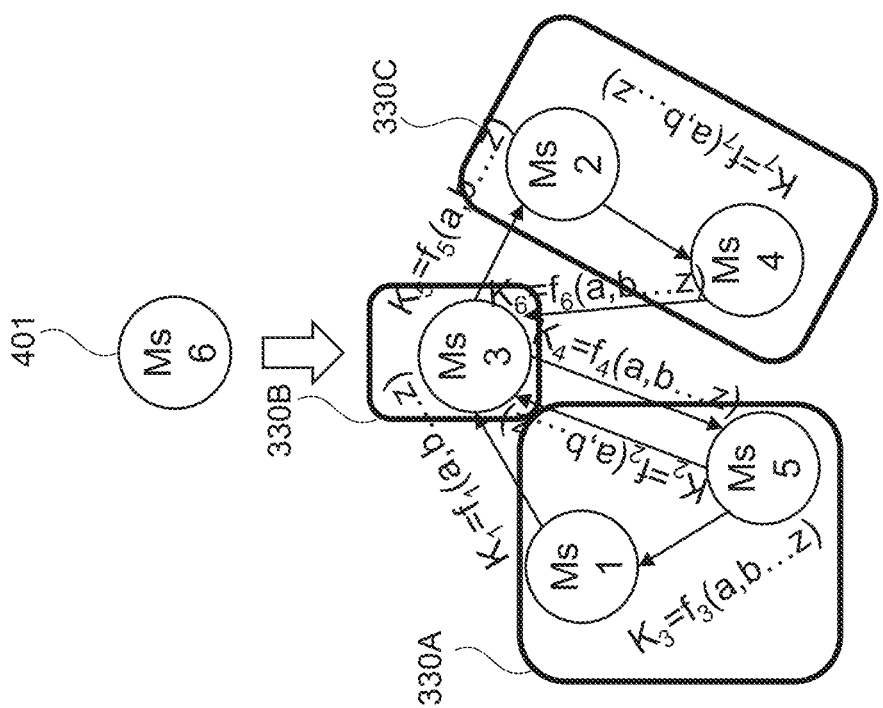
Figure 4B:
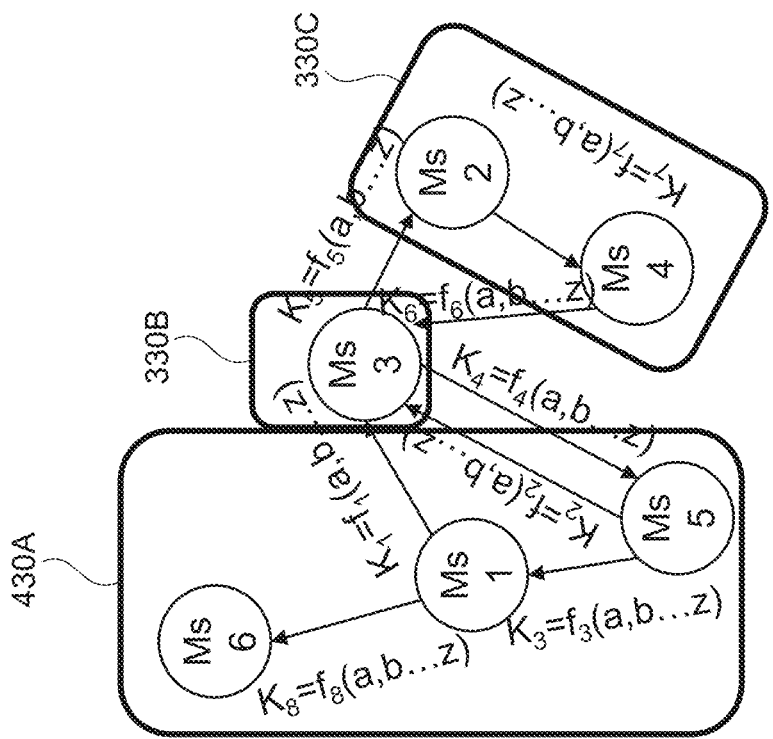
FIG. 4B depicts a diagram of a second phase of a method for determining a deployment configuration of a new micro service, in accordance with embodiments of the present invention.
Figure 4B:
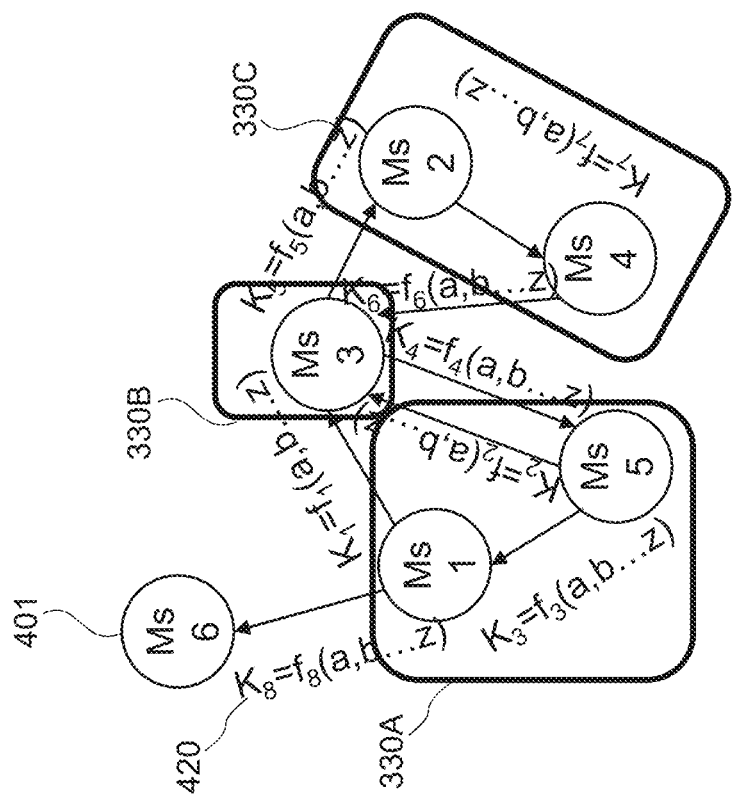

FIGS. 4A-C are diagrams depicting phases of a method for determining a deployment configuration of a new micro service 401 of the application 125, where the multiple micro services 301A-E are deployed as described with reference to FIGS. 3A-D. For example, the micro service 401 may represent a component of the application 125 that has been added after micro services 301A-E have been deployed.

FIG. 4A depicts a diagram of a first phase method for determining a deployment configuration of a new micro service, in accordance with embodiments of the present invention. In a first phase illustrated in FIG. 4A, the micro service 301A-E that requires communication with the micro service 401 is determined. In the embodiment of FIG. 4A, arc 402 indicates that micro service 301A can communicate with micro service 401 as the micro service 301A may request data or tasks from the micro service 401.

FIG. 4B depicts a diagram of a second phase of a method for determining a deployment configuration of a new micro service, in accordance with embodiments of the present invention. In a second phase illustrated in FIG. 4B, the determined arc 402 may be weighted as described above with reference to FIG. 3B to determine the weight 420. Using the weight 420 in addition to the other weights 320 as described with reference to FIGS. 3A-D, a grouping of the micro services 301A-E and 401 may be performed as described above. The resultant grouping may result in adding the new micro service 401 to the group 330A to become group 430A.

FIG. 4C depicts a diagram of a third phase of a method for determining a deployment configuration of a new micro service, in accordance with embodiments of the present invention. In a third phase illustrated in FIG. 4C, the newly identified groups 430A and 330B-C may be deployed. Because the micro service 402 has been added to the exiting group 330A, the deployment defined in FIGS. 3A-D may be maintained by deploying the group 430A on VM1 340A and groups 330B-C on VM2 340B and VM3 340C respectively.

Embodiments of a method embodied by FIGS. 4A-C may enable to add or remove a micro service, by repeating the phases described with reference to FIGS. 3A-D for communications involving the new micro service to be added.

Figure 5:
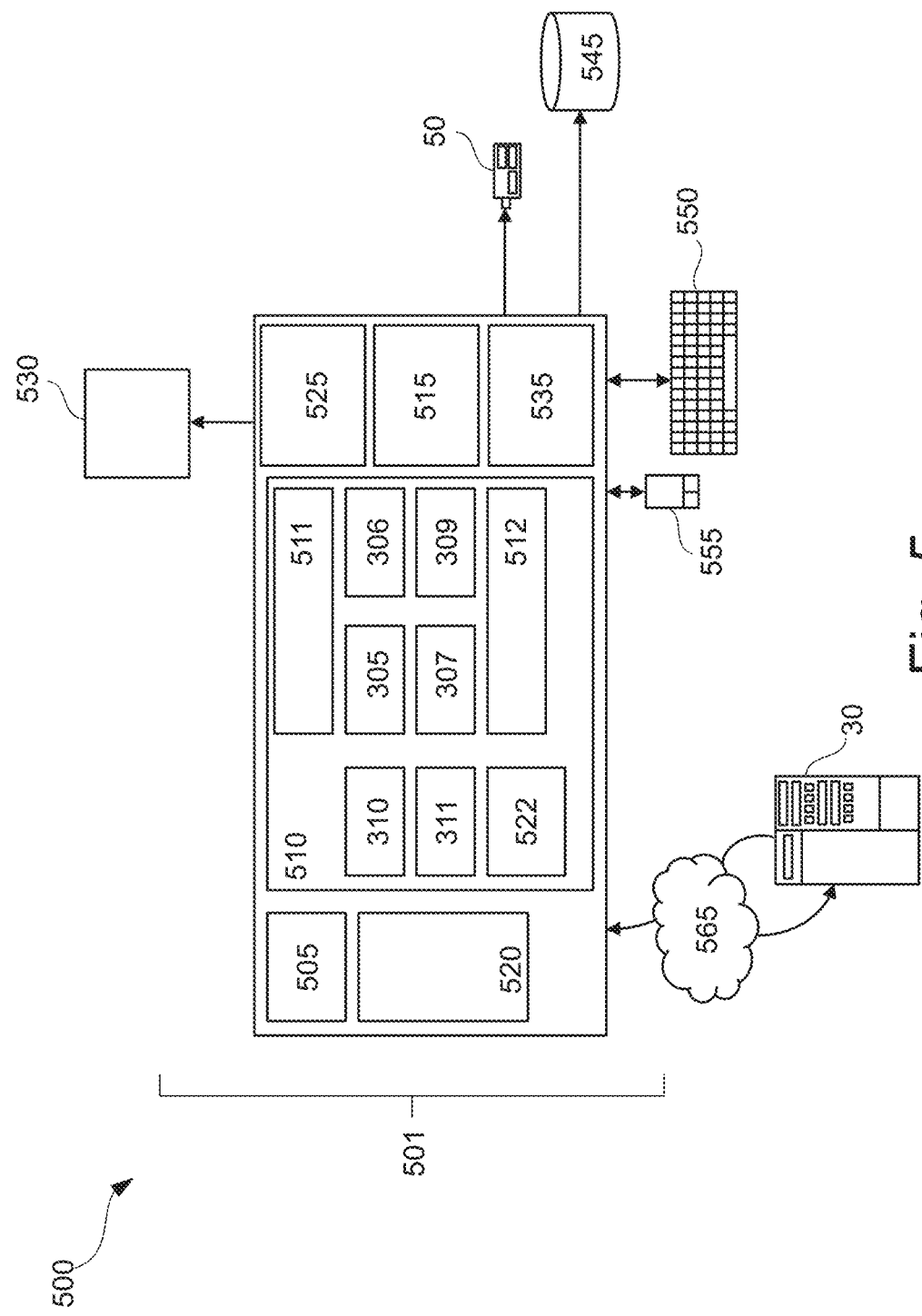
FIG. 5 depicts a block diagram of a computerized system, suited for implementing one or more method steps, in accordance with embodiments of the present invention.

FIG. 5 depicts a block diagram of a computerized system, suited for implementing one or more method steps, in accordance with embodiments of the present invention. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 512, 522 (including firmware 522), hardware (processor) 505, or a combination thereof. In exemplary embodiments, the methods described herein are implemented in software, as an executable program, and is executed by a special or general-purpose digital computer, such as a personal computer, workstation, minicomputer, or mainframe computer. The most general system 500 therefore includes a general-purpose computer 501.

In exemplary embodiments, in terms of hardware architecture, as shown in FIG. 1, the computer 501 includes a processor 505, memory (main memory) 510 coupled to a memory controller 515, and one or more input and/or output (I/O) devices (or peripherals) 50, 545 that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 50, 545 may generally include any generalized cryptographic card or smart card known in the art.

The processor 505 is a hardware device for executing software, particularly that stored in memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 510 can have a distributed architecture, where various components are situated remote from one another, but can be accessed by the processor 505.

The software in memory 510 may include one or more separate programs, each of which comprises an ordered listing of executable instructions for implementing logical functions, notably functions involved in embodiments of this invention. In the example of FIG. 1, software in the memory 510 includes instructions or software 512 e.g. instructions to manage databases such as a database management system.

The software in memory 510 shall also typically include a suitable operating system (OS) 511. The OS 511 essentially controls the execution of other computer programs, such as possibly software 512 for implementing methods as described herein.

The methods described herein may be in the form of a source program 512, executable program 512 (object code), script, or any other entity comprising a set of instructions 512 to be performed. When a source program, then the program needs to be translated via a compiler, assembler, interpreter, or the like, which may or may not be included within the memory 510, so as to operate properly in connection with the OS 511. Furthermore, the methods can be written as an object oriented programming language, which has classes of data and methods, or a procedure programming language, which has routines, subroutines, and/or functions.

The memory 510 may for example comprise components 305, 306, 307, 309, 310 and 311 of the micro services controller 109.

In exemplary embodiments, a conventional keyboard 550 and mouse 555 can be coupled to the input/output controller. Other output devices such as the I/O devices 545 may include input devices, for example but not limited to a printer, a scanner, microphone, and the like. Finally, the I/O devices 50, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 50, 545 can be any generalized cryptographic card or smart card known in the art. The system 500 can further include a display controller 525 coupled to a display 530. In exemplary embodiments, the system 500 can further include a network interface for coupling to a network 565. The network 565 can be an IP-based network for communication between the computer 501 and any external server, client and the like via a broadband connection. The network 565 transmits and receives data between the computer 501 and external systems 30, which can be involved to perform part or all of the steps of the methods discussed herein. In exemplary embodiments, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the software in the memory 510 may further include a basic input output system (BIOS) 522. The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software 512 stored within the memory 510, to communicate data to and from the memory 510, and to generally control operations of the computer 501 pursuant to the software. The methods described herein and the OS 511, in whole or in part, but typically latter, are read by the processor 505, possibly buffered within the processor 505, and then executed.

When the systems and methods described herein are implemented in software 512, as is shown in FIG. 1, the methods can be stored on any computer readable medium, such as storage 520, for use by or in connection with any computer related system or method. The storage 520 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g.,a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method comprising:
   determining one or more pairs of plurality of micro services whose metric is higher than a predefined threshold;
   grouping the one or more pairs into at least one group;
   assigning each group of the at least one group to a respective execution environment, and each of a non-grouped micro services to a respective execution environment;
   determining an execution environment for one or more new micro services from the group based on the metric being higher than the predefined threshold; and
   deploying the one or more new micro services on the execution environment.

2. The method of claim 1, wherein determining the metric comprises executing the at least two micro services, analyzing log data generated by the plurality of micro services and calculating the metric based on the analyzing.

3. The method of claim 1, wherein the metric describes an amount of communication traffic between at least two of the plurality of micro services.

4. The method of claim 1, wherein the execution environment is further determined based on an amount of available communication resources for data exchange between candidate execution environments on which the plurality of micro services could be deployed.

5. The method of claim 1, wherein the execution environment is selected from the group consisting of: a computing node, a virtual machine instantiated on a computing node, a software container instantiated on a computing node, a cluster of multiple computing nodes, and a data center.

6. The method of claim 1, further comprising modifying the deployment of an already instantiated micro service based on the deployment information, the modifying including migrating the already instantiated micro service from an original execution environment, on which the already instantiated micro service is currently running, to a target execution environment specified by the deployment information.

7. The method of claim 1, wherein the plurality of micro services interact with each other through a network, further wherein the metric is selected from the group consisting of: a network bandwidth capability, a network congestion, a delay, a delay jitter, and a loss rate.

8. A computer program product, comprising a computer readable hardware storage device storing a computer readable program code, the computer readable program code comprising an algorithm that when executed by a computer processor of a computing system implements a method comprising:
   determining one or more pairs of plurality of micro services whose metric is higher than a predefined threshold;
   grouping the one or more pairs into at least one group;
   assigning each group of the at least one group to a respective execution environment, and each of a non-grouped micro services to a respective execution environment;
   determining an execution environment for one or more new micro services from the group based on the metric being higher than the predefined threshold; and
   deploying the one or more new micro services on the execution environment.

9. The computer program product of claim 8, wherein determining the metric comprises executing the at least two micro services, analyzing log data generated by the plurality of micro services and calculating the metric based on the analyzing.

10. The computer program product of claim 9, wherein the metric describes an amount of communication traffic between at least two of the plurality of micro services.

11. The computer program product of claim 9, wherein the execution environment is further determined based on an amount of available communication resources for data exchange between candidate execution environments on which the plurality of micro services could be deployed.

12. The computer program product of claim 9, wherein the execution environment is selected from the group consisting of: a computing node, a virtual machine instantiated on a computing node, a software container instantiated on a computing node, a cluster of multiple computing nodes, and a data center.

13. The computer program product of claim 9, further comprising modifying the deployment of an already instantiated micro service based on the deployment information, the modifying including migrating the already instantiated micro service from an original execution environment, on which the already instantiated micro service is currently running, to a target execution environment specified by the deployment information.

14. The computer program product of claim 9, wherein the plurality of micro services interact with each other through a network, further wherein the metric is selected from the group consisting of: a network bandwidth capability, a network congestion, a delay, a delay jitter, and a loss rate.

15. A computer system comprising:
   a processor;
   a memory device coupled to the processor; and
   a computer readable storage device coupled to the processor, wherein the storage device contains program code executable by the processor via the memory device to implement a method for determining a deployment configuration of a plurality of micro services that interact with each other, the method comprising:
      determining one or more pairs of plurality of micro services whose metric is higher than a predefined threshold;
      grouping the one or more pairs into at least one group;
      assigning each group of the at least one group to a respective execution environment, and each of a non-grouped micro services to a respective execution environment;
      determining an execution environment for one or more new micro services from the group based on the metric being higher than the predefined threshold; and
      deploying the one or more new micro services on the execution environment.

16. The computer system of claim 15, wherein determining the metric comprises executing the at least two micro services, analyzing log data generated by the plurality of micro services and calculating the metric based on the analyzing.

17. The computer system of claim 15, wherein the metric describes an amount of communication traffic between at least two of the plurality of micro services.

18. The computer system of claim 15, wherein the execution environment is further determined based on an amount of available communication resources for data exchange between candidate execution environments on which the plurality of micro services could be deployed.

19. The computer system of claim 15, wherein the execution environment is selected from the group consisting of: a computing node, a virtual machine instantiated on a computing node, a software container instantiated on a computing node, a cluster of multiple computing nodes, and a data center.

20. The computer system of claim 15, further comprising modifying the deployment of an already instantiated micro service based on the deployment information, the modifying including migrating the already instantiated micro service from an original execution environment, on which the already instantiated micro service is currently running, to a target execution environment specified by the deployment information.

\* \* \* \* \*